US005290007A

United States Patent [19]

Lueues et al.

[11] Patent Number: 5,290,007

[45] Date of Patent: Mar. 1, 1994

[54] CONTROL DEVICE FOR VOLUME STREAM OF HYDRAULIC WORKING MEDIUM

[75] Inventors: Holger Lueues, Vaihingen/Enz; Hartmut Sandau, Schwieberdingen, both of Fed. Rep. of Germany

[73] Assignee: Robert Bosch GmbH, Stuttgart, Fed. Rep. of Germany

[21] Appl. No.: 954,916

[22] Filed: Sep. 30, 1992

[30] Foreign Application Priority Data

Dec. 10, 1991 [DE] Fed. Rep. of Germany ....... 4140604

[51] Int. Cl.[5] ..................... F16K 31/363; F16K 31/40

[52] U.S. Cl. .................................. 251/30.04; 91/461; 251/38; 251/44

[58] Field of Search ................. 91/461; 251/30.04, 38, 251/44

[56] References Cited

U.S. PATENT DOCUMENTS

| | | | |
|---|---|---|---|
| 3,033,228 | 5/1962 | Mohler | 251/30.04 X |
| 3,667,722 | 6/1972 | Katz et al. | 251/30.04 |
| 3,989,222 | 11/1976 | Yoshiyasu | 251/30.04 |
| 4,585,206 | 4/1986 | Itoh | 251/30.02 |
| 4,741,364 | 5/1988 | Stoss et al. | |
| 4,746,093 | 5/1988 | Scanderbeg | 251/38 X |
| 4,997,159 | 3/1991 | Yoshino et al. | 251/38 X |
| 5,048,790 | 9/1991 | Wells | 251/30.04 |

FOREIGN PATENT DOCUMENTS 3042277 6/1982 Fed. Rep. of Germany .

*Primary Examiner*—Gerald A. Michalsky
*Attorney, Agent, or Firm*—Michael J. Striker

[57] ABSTRACT

A control device for a volume stream of a hydraulic working medium has a blocking valve having a seat valve body cooperating with a stationary main valve seat, a pre-control valve member arranged in the seat valve member and cooperating with a valve seat provided with the seat valve member, an actuating device with which the pre-control valve member is in an operative communication, a spring providing a force with which the pre-control valve member cooperates with the valve seat and controls a pressure in a pressure chamber formed in the seat valve member and a valve housing. The seat valve member is pressed against the main valve seat under the action of the pressure, a pressure chamber for a working medium is formed, a throttle point with a constant cross-section communicates the pressure chamber between the seat valve body and the valve housing constantly with the pressure chamber of the working medium, a variable throttle point connects the pressure chamber between the seat valve body and the valve housing with a container. The variable pressure point has a cross-section which is changeable by the pre-control valve member. The actuating device which cooperate with the pre-control valve member is formed as a proportional magnet mounted on the locking valve.

8 Claims, 2 Drawing Sheets

CONTROL DEVICE FOR VOLUME STREAM OF HYDRAULIC WORKING MEDIUM

BACKGROUND OF THE INVENTION

The present invention relates to a control device for volume stream of a hydraulic working medium.

More particularly, it relates to a control device which has for example a working cylinder with a blocking valve having a seat valve body cooperating with a main valve seat in the housing, and a pre-control valve member in operative communication with an actuating element and cooperating with a valve seat provided in the seat valve body under the action of the spring to control the pressure in a pressure chamber formed between the seat valve member and the valve housing.

A control device of the above mentioned general type is disclosed for example in the German document DE-OS 30 42 277. In this control device, by means of a finely controllable locking valve or a so-called lowering valve, the load which for example acts at a consumer during lowering of the associated pressure medium stream does not act ahead. This blocking valve has a seat valve body, in which a pre-control valve member is provided. The pre-control valve member extends with a draw pin into an outflow opening. Such a blocking valve has the disadvantage that the pressure medium can flow out when the control pin of the pre-control valve member extends outwardly of the outflow opening. The actuating path over which an actuating device of the pre-control valve member must move before the pressure medium can flow out is therefore very long.

U.S. Pat. No. 4,741,364 discloses how a load can be raised or lowered via a pre-controlled, complicated control valve which has a main control slider and a pre-control slider. The actuating device is formed as a proportional magnet which acts on the pre-control slider. For regulating the output pressure of the control valve, a complicated force comparison between the forces during the action of a pressure spring and during the action of the pressure is performed. A sequence control between the main control slider and the pre-control slider is not provided.

SUMMARY OF THE INVENTION

Accordingly, it is an object of the present invention to provide a control device for a volume flow of a hydraulic working medium, which avoids the disadvantages of the prior art.

In keeping with these objects and with others which will become apparent hereinafter, one feature of the present invention resides, briefly stated, in a control device in which a pressure chamber formed between a seat valve body and a valve housing is permanently connected via a throttle point of a constant cross-section with a pressure chamber of a working medium means and is connectable with a container through a variable throttle point whose cross-section is changeable by the pre-control valve member, and the actuating device cooperating with the pre-control member is formed as a proportional magnet mounted on the blocking valve.

When the control device is designed in accordance with the present invention, it eliminates the disadvantages of the prior art.

In particular, the control device of the invention has the advantage that the actuating path for the blocking valve (lowering valve) is very short and the required actuating forces are very low so that the conditions for the use of proportional magnets as adjusting devices are fulfilled. Thereby the pressure medium stream can be finely controlled. This is obtained by a sequence control of the pre-control valve member and the seat valve member, which is possible by the shaping of the seat valve member and the construction of the pre-control valve member. Thereby an especially continuous, finely controlled outflow of the pressure medium from the pressure chamber of the working cylinder is ensured. Furthermore, due to the use of the seat valves in closed conditions, extremely low leakages are obtained, so that the loads are maintained over very long time. Due to the cooperation of the not changeable throttle point with the variable throttle point, moreover a stable course of the characteristic line for a great region is obtained. This high stability of the blocking valve leads to a vibration free operation, which reduces quenching and whistling noises. Due to the inventive control device, especially the pressure medium stream which flows back from a consumer (working cylinder) can be throttled, and therefore no pre-mature running of the load or "backing" occurs.

In accordance with another feature of the present invention, the throttle point with the permanent cross-section is formed in the seat valve member, while the cross-section of the variable throttle point is changed by a relative displacement of the pre-control valve member relative to the seat valve member.

The pre-control valve member can be displaceable against the action of a pressure spring by proportional magnets. The seat valve member can have a fine control slider which is spatially separated from the main valve seat. The main valve seat which cooperates with the seat valve member can be arranged in a valve insert of the housing. The fine control slider of the seat valve member can cooperate with an opening in the valve insert of the housing.

Finally, the blocking valve can have means for deviation of the pressure medium stream, which prevent an impact pressure in the open blocking valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
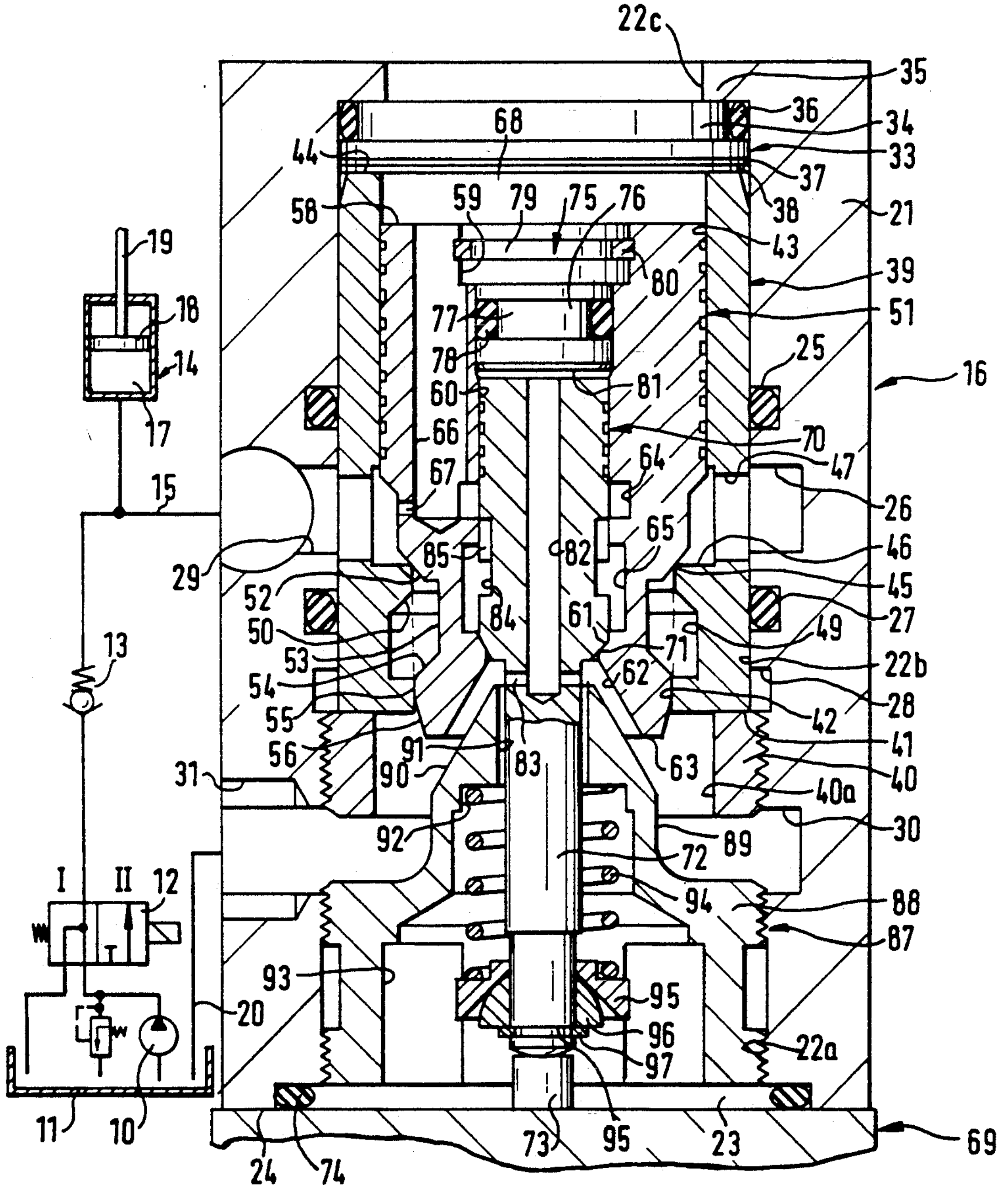
FIG. 1 is a view showing a longitudinal section of the hydraulic control device with a blocking valve, for a volume stream of the hydraulic working medium, in accordance with the present invention.

A control device as shown in FIG. 1 has a pump 10 which aspirates a pressure medium from a container 11. The pressure medium is supplied through 3/2-way valve 12 and a return valve 13 to a unidirectional working cylinder 14, and via a conduit branch 15 between the working cylinder 14 and the return valve 13 to a blocking valve 16. The working cylinder 14 has a pressure chamber 17 in which a piston 18 with a piston rod 19 is guided. A return conduit 20 leads from the blocking valve 16 to the container 11.

The blocking valve 16 has a valve housing 21 with an opening which extends in a longitudinal direction and has two steps. Its opening portions are successively identified as 22*a*, 22*b*, 22*c*. The opening extends from a cylindrical depression 23 formed in an end side 24 of the housing 21.

In the central opening region 22*b*, four annular grooves 25, 26, 27, 28 are provided. The annular groove 25 is arranged in the central region of the opening portion 22*b*. The annular groove 28 is located at the transition from the opening portion 22*a*, which is provided with an inner thread.

The annular groove 26 located between the annular grooves 25 and 27 or 28 is wider and deeper. It communicates through a pressure medium passage 29 extending through the housing 21, with a conduit branch 15 leading to the working cylinder 14 or to the return valve 13. An annular groove 30 is provided in the lower opening region 22*a* and communicates with a return conduit 20 which leads to the container 11 through a throughgoing passage 31.

The valve housing 21 is closed at its one side by a plug 33. The plug is inserted in the opening portion 22*b* and abuts with a projection 34 of a smaller diameter against an annular shoulder 35 which is formed at the transition from the opening portion 22*b* to the opening portion 22*c*. For sealing, the projection 34 is surrounded by a sealing ring 36.

Intermediate rings 37 and 38 located one behind the other abut against the side of the plug 33 which is opposite to the opening portion 22*c*. A cylindrical valve insert 39 abuts against the intermediate rings 37 and 38. It is fixed by a clamping screw 40 with throughgoing inner hexagon 40*a*. The screw is screwed in the opening portion 22*a* and abuts against a lower end side 41 of the valve insert 39. An axially extending opening 42 extends from this end side 41 in the valve insert 39 and opens into an axis-parallel opening 43 of a greater diameter. The opening 43 extends from an end side 44 of the valve insert 39 which end side 44 abuts against the intermediate ring 38. The transition of the openings 42 and 43 is formed as the main valve seat 45. In the region of this main valve seat 45, an annular groove 46 is provided in the opening 43. Several radially extending openings 47 extend from the annular groove 46 through the valve insert 39 and communicate with the annular groove 26 in the valve housing 21.

An annular groove 49 is provided in the wall of the opening 42. Its portion 50 which faces the valve seat narrows to the opening 43 in a conical manner, but does not extend to the main valve seat 45. A seat valve member 51 is inserted in the valve insert 39 from the opening 42. It has a narrowing portion which cooperates as a valve cone 52 with the main valve seat 45. A cylindrical projection 53 extends from the valve cone 52 into the annular groove 49 and emerges into a raising portion 54. The raising portion 54 extends conically to the diameter of the opening 42. The raising portion 54 is formed so that its greater diameter is located in the region of the opening 42 when the valve cone 52 abuts against the main valve seat 45.

A short, cylindrical portion 55 follows the raised portion 54. In the above described position of the seat valve body member 51 it extends into the portion of the opening 42 which faces the end side 41. The cylindrical portion 55 transits into a narrowing fine control cone 56 which extends through the opening 42 to the opening portion 22*a*.

A cylindrical depression 59 is provided in the end side 58 of the seat valve member 51 which faces the intermediate rings 37 and 38. An axis-parallel. smaller longitudinal opening 60 extends from the depression 59. The base of the longitudinal opening 60 is conical toward the end side 63 and serves as a valve seat 61. This valve seat transits into an opposite, conical depression 62 extending to the opposite end side 63 of the seat valve body 51.

Two annular grooves 64 and 65 are formed in the longitudinal opening 60. The upper annular groove 44 extends in the region of the annular groove 47 of the valve insert 39. A lower annular groove 65 lies at the transition from the longitudinal opening 60 to the valve seat 61.

A further longitudinal opening 66 is arranged in the seat valve member. It extends from the end side 58 and runs eccentrically and axis-parallel to the longitudinal opening 60. These further longitudinal openings 66 extend through the region of the annular groove 64 and is connected with the latter. The eccentrically arranged longitudinal openings 66 and the annular groove 47 in the valve insert 39 are connected with one another by a throttle opening 67 extending through the seat valve member 51. The eccentric longitudinal opening 66 provides a connection to a pressure chamber 68 which is formed in the opening 43 of the valve insert 39 between the block 33 and the seat valve member 51.

A cylindrical pre-control member 70 is inserted in the longitudinal opening 60 of the seat valve member 51. It has a conically reducing cross-section which cooperates as a pre-control valve cone 71 with the valve seat 61. A cylindrical portion 72 of a smaller diameter, which follows the pre-control valve cone, extends in the opening portion 22 to the vicinity of the depression 23 and abuts thereagainst the plunger 73 of a proportional magnet 69. The proportional magnet 69 abuts against the end side 24 of the valve housing 21 and closes the same. Due to a sealing ring 74 inserted in the depression 23 the connection is sealed.

The longitudinal opening 60 of the seat valve member 51 is closed at its one side by a plug 75. The plug inserted in a depression 59 and extends with a projection 76 of a smaller diameter in the longitudinal opening 60. A sealing ring 78 is inserted in the sealing groove 7 provided in the projection 76 for sealing the same. The sealing ring 78 abuts against the wall of the longitudinal opening 60. The plug 75 is fixed in a corresponding annular groove 79 in a safety ring 80 inserted in the depression 59. The plug 75 is formed so that between the projection 76 and the pre-control valve member 70, a pressure chamber 81 is formed in the longitudinal opening 60 when the pre-control valve member 70 abuts against the valve seat 61 with its pre-control valve cone 71.

A longitudinal opening 82 is arranged from this pressure chamber 81 in the pre-control valve 70 and extends into the cylindrical portion 72. In the region of the depression 62 of the seat valve member 51, the longitudinal opening 82 is connected with a transversely extending throttle opening 83 which passes through the cylindrical portion 72.

An annular groove 84 is formed on the periphery of the pre-control valve member 70 and arranged in the region of the annular groove 65 of the seat valve member 51. Fine control notches 85 with narrowing cross-section extends from the annular groove 84 to the annular groove 64. The fine control notches are formed so that they do not directly reach the annular groove 64 when the pre-control valve cone 71 abuts against the valve seat 61.

A substantially bucket-shaped adjusting screw 87 is inserted in the valve housing 21 by screwing in the opening portion 22*a*. Its bottom 88 faces the clamping screw 40 but does not reach the latter. A cylindrical projection 89 extends from the bottom 88 and transits into a truncated cone 90. The latter extends to the conical depression 62 of the seat valve member 51. Two openings 91 and 92 which merge into one another extend through the cylindrical projection 89 and the truncated cone 90 for guiding the cylindrical portion 72 of the pre-control valve 70 in an axial direction. The opening 91 of a smaller diameter extends in the truncated cone 90, its diameter is greater than the diameter of the cylindrical portion 72. The opening 92 of a greater diameter is formed in the cylindrical projection 89 and extends from the inner chamber 93 of the adjusting screw formed as an inner hexagon.

The truncated cone 90 is formed so that the throttle opening 83 is located inside the depression 62 and outside the opening 91 of the truncated cone 90, when both the pre-control valve cone 71 abuts against the valve seat 61 and the valve cone 52 abuts against the main valve seat 45.

At the end of a pressure spring 94 abuts against the base of the bottom opening 92. The pressure spring surrounds the cylindrical portion 71 of the pre-control valve member 70 and its opposite end abuts against a pressure ring 95. The pressure ring 95 surrounds the cylindrical portion 72 near the end side which faces the plunger 73. It is secured against displacement by a spherical segment 96 and a safety ring 97 which is inserted in an annular groove 98 of the cylindrical portion 72.

When the 3/2-way valve 12 is located in its neutral position I shown in FIG. 1, the blocking valve 16 with a not energized proportional magnet 69 is closed. Under the action of the pressure spring 94 the cylindrical portion 72 and thereby the pre-control valve member 70 are pulled downwardly, so that the pre-control valve cone 71 abuts against the valve seat 61. Thereby also the seat valve member 51 is pulled downwardly so that its valve cone 52 abuts against the main valve seat 45. Thereby the annular groove 46 and the opening 43 are sealed from the opening 42 and the annular groove 49. The pressure medium runs from the pressure chamber 17 of the working cylinder 14 through the conduit branch 15 and the pressure medium passage 29 through the opening 47 in the ring groove 46. The return valve 13 prevents a pressure medium stream from the working cylinder 14 to the 3/2-way valve 12. The pressure building in the annular groove 46 acts through the throttle opening 67 and the opening 66 also in the pressure chamber 68 as well as in the annular groove 64 of the seat valve member 51. This annular groove is sealed by the pre-control valve member 70 against the annular groove 65. Furthermore, the annular groove 49 in the valve insert 39 is sealed from the annular groove 30 and thereby the return conduit 90 by the cylindrical portion 55 of the fine control cone 56 located in the opening 42.

The seat valve member 51 is therefore additionally pressed against the main valve seat 45 of the valve insert 39 under the action of the pressure in the pressure chamber 68. This pressing force is reduced by the force due to the action of the pressure in the annular grooves 26 and 46 on the annular face between the outer periphery of the seat valve member 51 and the effective sealing periphery on the main valve seat 45.

The pressure in the return conduit 20 (pressure in the container 11) acts due to the connection through the channel 31 also in the annular groove 30. From there a connection to the longitudinal opening 82 in the pre-control valve member 70 and therefore the pressure chamber 11 is established over the truncated cone 90 through the throttle opening 83. Further, a connection to the inner chamber 93 of the adjusting screw 87 is provided through the annular chamber between the opening 91 and the cylindrical portion 72.

The leakage losses in the closed position of the blocking valve 16 from the region of high pressure (working pressure in the pressure chamber 17) against the region of the low pressure (return conduit 20, return pressure) are substantially lower due to the multiple sealing point and due to the seat valve construction.

When the proportional magnet 69 is energized, the pre-control valve 70 is moved outwardly through the cylindrical portion 72 by the plunger 73. The pre-control valve cone 71 is lifted from the valve seat 61 and the fine control notches 85 arrive in the region of the annular groove 64. The pressure medium which is under pressure in the pressure chamber 68 can flow through the opening 66, the annular groove 64 and the fine control notches 85 into the annular groove 65. From there, over the open valve seat 62 and the pre-control valve cone 71 a connection is established to the depression 62 which connects over the truncated cone 90 with the annular groove 30. In dependence on the opening cross-section (insertion depth of the fine control notches 85 in the region of the annular groove 64) the pressure in the pressure chamber 68 falls. This pressure is adjusted in correspondence with the ratio of the throttle cross-section at the throttle 67 and the opening cross-section of the fine control notch 85. If in correspondence with the upwardly displaced pre-control valve member 70 the pressure in the pressure chamber 68 falls so that the pressure force in the annular groove 46 at the annular surface between the outer periphery of the seat valve body 51 and the sealing periphery at the main valve seat 45 is overcome, the seat valve member 51 is lifted from the main valve seat 45. The pressure medium flows from the annular groove 46 past the open main valve seat 45 in the annular groove 49. From there a communication is established at the fine control cone 56 which is inserted in the annular groove 49, to the inner hexagon 48. The pressure medium flows from there through the annular groove 30 and then through the return conduit 20 to the container 11. Due to the opening movement of the seat valve member 51 the relative displacement between it and the pre-control valve member 70 is reduced, so that the opening cross-section at the fine control notch 85 is smaller. Thereby a higher pressure can build in the pressure chamber 68 over the throttle 67. Thus, the opening movement of the seat valve member 51 is braked, until a condition of equilibrium is adjusted. The pressure medium can now simultaneously flow from the annular groove 46 or the conduit branch 15, so that the lowering load at the working cylinder 14 does not lead, and the scratching noise and pushes of the working cylinder are eliminated.

When the plunger 73 of the proportional magnet 69 is moved upwardly, the pre-control valve member 70 follows this movement due to the action of the pressure spring 94. The opening cross-section of the fine control notch 85 is thereby smaller or zero so that the pressure in the pressure chamber 68 rises. Due to this rising pressure in the pressure chamber 68 and the mechanical guidance of the pre-control valve member 70 via the pre-control valve cone 71 at the valve seat 61, the seat valve member 51 moves downwardly (sequence control). The force for moving the pre-control valve member 70 is first of all dependent on the pre-tensioning force of the pressure spring 94. This pre-tensioning force can be varied by a corresponding adjusting screw depth of the adjusting screw 88. Since the pressures at the pre-control valve member 17 are approximately equalized through the longitudinal opening 82 and the transverse or throttle opening 83, the hydraulic forces on the pre-control valve 70 are correspondingly low. The actuation path and the actuation force for the pre-control valve member 70 and thereby for the blocking valve 16 are small.

When the pressure in the pressure chamber 17 of the working cylinder and thereby in the annular groove 46 are too low to move the seat valve member 51 in the opening direction, it can be pushed through the pre-control valve member. The pre-control valve member 70 is for this purpose pressed through the plunger 73 of the proportional magnet 89 to the projection 76 of the plug 75 so that the seat valve member 51 is therefore moved.

For lifting a load the working cylinder 14, the 3/2-way valve 12 is brought in the switching position II so that the pressure medium flows by the pump 10 through the return valve 13 located in the throughgoing position, to the working cylinder 14.

As described hereinabove, the locking valve 16 is characterized by low required operating forces and by short actuating path. The hydraulic forces on the pre-control valve member 70 are approximately equalized and the impact pressure on the pre-control valve member 17 in the region of the valve seat 71 or the adjusting screw 87 are avoided due to the respective conical shape of the seat valve member and the adjusting screw 87 in the region of the truncated cone 90. Due to this deviation, both the pre-control volume stream at the valve seat 71 and the main volume stream at the open fine control cone 56 are deflected to the annular groove 30, without substantial impact pressure in the region of the cylindrical portion 72 in the inner chamber 93 of the adjusting screw 87.

Due to the spatial separation of the valve cone 52 and the fine control cone 56, they can be produced without high manufacturing expenses. If the seat valve member 51 is moved upwardly, the valve cone 52 is lifted from the main valve seat 45. The pressure medium can however not flow out from the annular groove 49 since the short cylindrical portion 55 of the fine control cone 56 is inside the opening 42 (gap seal). When the short cylindrical portion 55 extends out of the opening 52, the pressure medium stream can increase in dependence on the insertion depth of the fine control cone 56. Variations of the volume stream course during opening of the seat valve member are avoided in that the sealing point of the valve cone 52 at the main valve seat 45 is located after the gap seal at the fine control cones 55, 56. These spatially separated formations of the main control cone (valve cone 45) and the fine control cone 56 are more favorable from the manufacturing point of view than the direct transition from the main control cone 45 to the fine control cone in connection with only one sealing point. For avoiding the variations of the throughflow characteristic line, moreover, the diameter (effective diameter) of the main valve seat 45 and of the cylindrical portion 55 must be equal.

Figure 2:
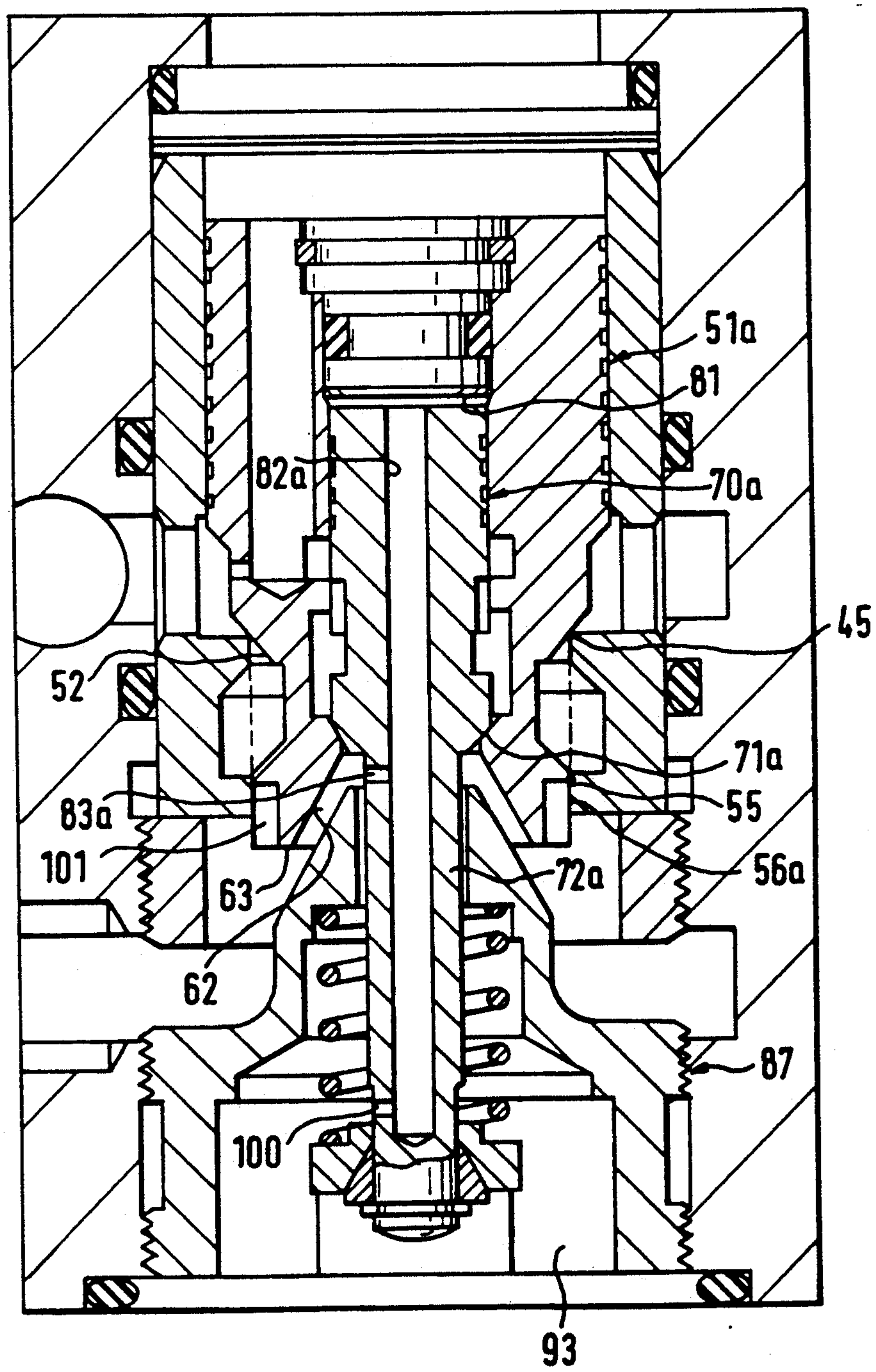
FIG. 2 is a view substantially corresponding to the view of FIG. 1, but showing a further modification of the control device of the present invention.

FIG. 2 shows a different embodiment of the locking valve of the invention in which the construction of the pre-control valve member 78 and of the seat valve member 51 are changed. The pre-control valve member 78 differs from the above described construction by an extended longitudinal opening 82*a*. This opening extends through the cylindrical portion 72*a* almost completely or in other words it extends to the vicinity of its free end side. A transversely extending throttle opening 100 opens in the region of the opening bottom in the longitudinal opening and connects it with the inner chamber 93 of the adjusting screw 87. Near the transition from the pre-control valve cone 71*a* to the cylindrical portion 72*a*, the throttle opening 83*a* is formed in the latter and opens also in the longitudinal opening 82*a*.

In contrast to the above described embodiment, the cylindrical portion 55 at the seat valve body 51*a* transits into a cylindrical fine control portion 56*a* of the same diameter. Triangular fine control notches 101 are arranged at its periphery from the free end side 63. They face the cylindrical portion 55 and reduce toward the latter.

Such a fine control portion is simpler to handle for the manufacturing point of view and again improves the constancy of the valve characteristic line. During lifting of the valve cone 52 from the main valve seat 45, the gap length at the fine control portion is considerably greater than in the cylindrical fine control notch of FIG. 1. Thereby the leak losses through the gap are substantially lower.

Due to the above described construction of the pre-control valve member 70 or 70*a* the pressure can act, and thereby non-uniformities in the valve characteristic line can be produced. Due to the small diameter of the cylindrical portion 72 a force can act also on the annular shoulder in the region of the pre-control cone 71 or 71*a*. This force is dependent from pressure which acts there. When due to the flow dynamics the pressure at this annular surface differs from the pressure at both end sides, the hydrostatic forces of the pre-control valve member are not compensated. These forces can be compensated through the throttle openings 83*a* and 100 in FIG. 2. These throttle openings are dimensioned so that the pressure in the longitudinal opening 82 and thereby in the pressure chamber 81 is always so high that the hydrostatic forces on the pre-control valve 70 are compensated. The pressure in the longitudinal opening 83 is a pressure which is formed between the pressures in the region of the inner chamber 93 and in the in region of the depression 62.

It will be understood that each of the elements described above, or two or more together, may also find a useful application in other types of constructions differing from the types described above.

While the invention has been illustrated and described as embodied in a control device for a volume stream of a hydraulic working medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control device for a volume stream of a hydraulic working medium, comprising a blocking valve having a seat valve member cooperating with a stationary main valve seat; a pre-control valve member arranged in said seat valve member and cooperating with a valve seat provided in said seat valve member; an actuating device with which said pre-control valve member is in an operative cooperation; a spring providing a force with which said pre-control valve member cooperates with said valve seat and controls a pressure in a pressure chamber formed in said seat valve member and a valve housing, said seat valve member being pressed against said main valve seat under the action of said pressure; means forming a pressure chamber for working means; a throttle point with a constant cross-section through which said pressure chamber between said seat valve body and said valve housing constantly communicates with said pressure chamber of said working means; a variable throttle point through which said pressure chamber between said seat valve body and said valve housing is connectable with a container, said variable throttle point being spaced from said valve seat of said pre-control valve member and having a cross-section which is changeable of said pre-control valve member, said actuating means which cooperate with said pre-control valve member being formed as a proportional magnet mounted on said blocking valve, said seat valve member having a fine control slider, said main valve seat having an effective diameter which is equal to a diameter of said fine control slider.

2. A control device as defined in claim 1, wherein said throttle point with a constant cross-section is formed in said seat valve body.

3. A control device as defined in claim 1, wherein said cross-section of said variable throttle point is changed by a relative displacement of said control valve member relative to said seat valve member.

4. A control device as defined in claim 1, wherein said pre-control valve member is displaceable against an action of said pressure spring by said proportional magnet.

5. A control device as defined in claim 1, wherein said seat valve member has a fine control slider which is spatially separated from main valve seat.

6. A control device as defined in claim 5; and further comprising a valve seat fixed in said housing, said main valve seat which cooperates with said seat valve member is arranged in said valve seat fixed in said housing.

7. A control device as defined in claim 6, wherein said valve seat fixed with said housing has an opening, said fine control slider of said seat valve member cooperates with said opening in said valve seat.

8. A control device as defined in claim 1, wherein said blocking valve has means for deviating a pressure medium stream in which with said blocking valve in an open position prevents impact pressure.

* * * * *